United States Patent

Kim

[11] Patent Number: 5,986,772
[45] Date of Patent: Nov. 16, 1999

[54] TECHNIQUE FOR AUTOMATICALLY CONTROLLING RESOLUTION

[75] Inventor: Han-Sin Kim, Seoul, Rep. of Korea

[73] Assignee: SamSung Electronics Co., Ltd., Kyungki-do, Rep. of Korea

[21] Appl. No.: 08/885,997

[22] Filed: Jun. 30, 1997

[30] Foreign Application Priority Data

Jun. 29, 1996 [KR] Rep. of Korea .................... 96-26433

[51] Int. Cl.⁶ .................. H04N 1/32; H04N 1/40; B41B 15/00
[52] U.S. Cl. ................. 358/468; 358/467; 395/102
[58] Field of Search ................. 358/468, 467, 358/465, 494, 474, 426, 261.1, 433, 444, 445, 261.3, 429, 434, 456, 450, 448, 463; 382/299, 300; 395/102, 101, 107, 108, 110, 114

[56] References Cited

U.S. PATENT DOCUMENTS

| | | | |
|---|---|---|---|
| 3,974,325 | 8/1976 | Wilmer | 178/6 |
| 4,028,731 | 6/1977 | Arps et al. | 358/260 |
| 4,070,694 | 1/1978 | Sakamoto et al. | 358/133 |
| 4,115,815 | 9/1978 | Nakagome et al. | 358/260 |
| 4,191,974 | 3/1980 | Ono et al. | 358/261 |
| 4,193,092 | 3/1980 | Stoffel | 358/136 |
| 4,291,339 | 9/1981 | Ogawa et al. | 358/260 |
| 4,396,952 | 8/1983 | Tisue et al. | 358/260 |
| 4,571,632 | 2/1986 | Schaphorst et al. | 358/260 |
| 5,202,771 | 4/1993 | Murayama | 358/426 |
| 5,227,772 | 7/1993 | Takebe | 340/735 |
| 5,235,436 | 8/1993 | Sakamoto et al. | 358/462 |
| 5,274,462 | 12/1993 | Satoh | 358/428 |
| 5,337,159 | 8/1994 | Iida et al. | 358/447 |
| 5,668,635 | 9/1997 | Tomida et al. | 358/296 |
| 5,677,721 | 10/1997 | Suzuki et al. | 347/190 |
| 5,706,096 | 1/1998 | Koike | 358/261.2 |
| 5,894,329 | 4/1999 | Takeda | 348/446 |

FOREIGN PATENT DOCUMENTS 0 205 751 3/1986 European Pat. Off. .

*Primary Examiner*—Madeline Nguyen
*Attorney, Agent, or Firm*—Robert E. Bushnell, Esq.

[57] ABSTRACT

A facsimile machine scans one document page which is a mixture of an elaborative image and a normal image, and transmits the elaborative image portion in a fine mode and the normal image portion in a standard mode, so as to save a transmission time, maintaining the quality of the image. To this end, a previous line is compared with a current line to detect a dot number difference. If the dot number difference is not greater than a predetermined value, a command code is transmitted to a called facsimile machine to print the same image data as that of the previous line. Otherwise, if the dot number difference is greater than the predetermined value, the scanning data is coded by the existing coding method and transmitted to the called facsimile machine. In this way, it may be possible to save the data transmission time.

8 Claims, 2 Drawing Sheets

TECHNIQUE FOR AUTOMATICALLY CONTROLLING RESOLUTION

CLAIM OF PRIORITY

This application makes reference to, incorporates the same herein, and claims all benefits accruing under 35 U.S.C. §119 from an application for *METHOD FOR AUTOMATICALLY CONTROLLING RESOLUTION* earlier filed in the Korean Industrial Property Office on the day of Jun. 29, 1996 and there duly assigned Ser. No. 26433/1996, a copy of which application is annexed hereto.

BACKGROUND OF THE INVENTION

1. Field of the Invention

The present invention relates to a technique for controlling a resolution in an image processing system, and more particularly a technique for automatically controlling a resolution of a document to be transmitted and/or copied.

2. Description of the Related Art

In general, a facsimile has a resolution control function which includes a standard mode, a fine mode, and a super fine mode. If a user selects one of the above mentioned resolution modes by using an operating panel in order to control a resolution of the document to be transmitted, a controller (e.g., central processing unit) recognizes the selected resolution mode and transmits corresponding mode information according to a protocol to a called facsimile prior to transmitting actual image data. Thereafter, the facsimile transmits the document image based on the selected mode information. At this moment, the user should check every new page as to whether or not the resolution mode should be changed, thereby causing inconveniences. Once the resolution mode is selected for a page, the whole page will be transmitted with the same resolution.

The standard mode is to scan the document every other line (where one line is 1/7.7 mm) and code the scanned image to transmit to the called facsimile. Then, the called facsimile prints one line with the received image and prints a next line with the same image. The fine mode is to scan the document line by line and code the scanned image to transmit to the called facsimile. Then, the called facsimile prints the received images line by line. Further, the super fine mode is to scan the document every half line (where a half line is 1/15.4 mm) and code the scanned image to transmit to the called facsimile. The transmitted image is printed at the called facsimile every half line. Thus, in the light of the vertical lines, the resolution with respect to one line becomes 1/3.85 mm in the standard mode, 1/7.7 mm in the fine mode, and 1/15.4 mm in the super fine mode. For the convenience of explanation, it is assumed that one line is 1/7.7 mm throughout the specification.

As can be clearly appreciated from the above descriptions, the standard mode has a fast transmission speed but a low resolution. On the contrary, the fine mode and the super fine mode have a high resolution, but they have the disadvantage of the low transmission speed. Conventionally, when scanning a document in a facsimile, the user should determine an elaboration of the document by the naked eye, and select the resolution mode accordingly.

Therefore, in the case where the document is a mixture of the elaborative image and the normal image, several problems may be caused unavoidably. Namely, it takes a long time to transmit the document in the fine or super fine mode continuously, which results into an expensive communication fee. On the contrary, if the user transmits the document in the standard mode in order to reduce the transmission time, a quality of the image will be degraded. Furthermore, in the case where the facsimile is erroneously set to the standard mode for a document that should have been set to the fine or super fine mode, the user might retransmit document due to the degradation of the image.

The following patents each disclose features in common with the present invention but do not teach or suggest the specifically recited features of the present invention: U.S. Pat. No. 5,337,159 to Iida et al., entitled *Image Data Smoothing Method*, U.S. Pat. No. 5,274,462 to Satoh, entitled *Image Input And Output Method*, U.S. Pat. No. 4,028,731 to Arps et al., entitled *Apparatus For Compression Coding Using Cross-Array Correlation Between Two-Dimensional Matrices Derived From Two-Valued Digital Images*, U.S. Pat. No. 4,070,694 to Sakamoto et al., entitled *Picture Image Information Band Compression And Transmission System*, U.S. Pat. No. 4,115,815 to Nakagome et al., entitled *Facsimile Signal Coding Method*, U.S. Pat. No. 4,191,974 to Ono et al., entitled *Facsimile Encoding Communication System*, U.S. Pat. No. 3,974,325 to Wilmer, entitled *Interpolator For Facsimile Bandwidth Compression*, U.S. Pat. No. 4,193,092 to Stoffel, entitled *Image Interpolation System*, U.S. Pat. No. 4,291,339 to Ogawa et al., entitled *Facsimile Transceiver*, U.S. Pat. No. 4,396,952 to Tisue et al., entitled *Facsimile Transmission Apparatus*, and U.S. Pat. No. 4,571,632 to Schaphorst et al., entitled *Alternate Line Interpolation Method And Apparatus*.

SUMMARY OF THE INVENTION

It is therefore an object of the present invention to provide a technique for automatically controlling a resolution of a document to be transmitted or copied.

According to the present invention, a facsimile machine scans one document page which is a mixture of an elaborative image and a normal image, and transmits the elaborative image portion in a fine mode and the normal image portion in a standard mode, so as to save a transmission time, maintaining the quality of the image. To this end, a previous line is compared with a current line to detect a dot number difference therebetween. If the dot number difference is not greater than a predetermined value, a command code is transmitted to a called facsimile machine to print the same image data as that of the previous line. Otherwise, if the dot number difference is greater than the predetermined value, the scanning data is coded by the existing coding method and transmitted to the called facsimile machine. In this way, it may be possible to save the data transmission time.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT(S)

Figure 1:
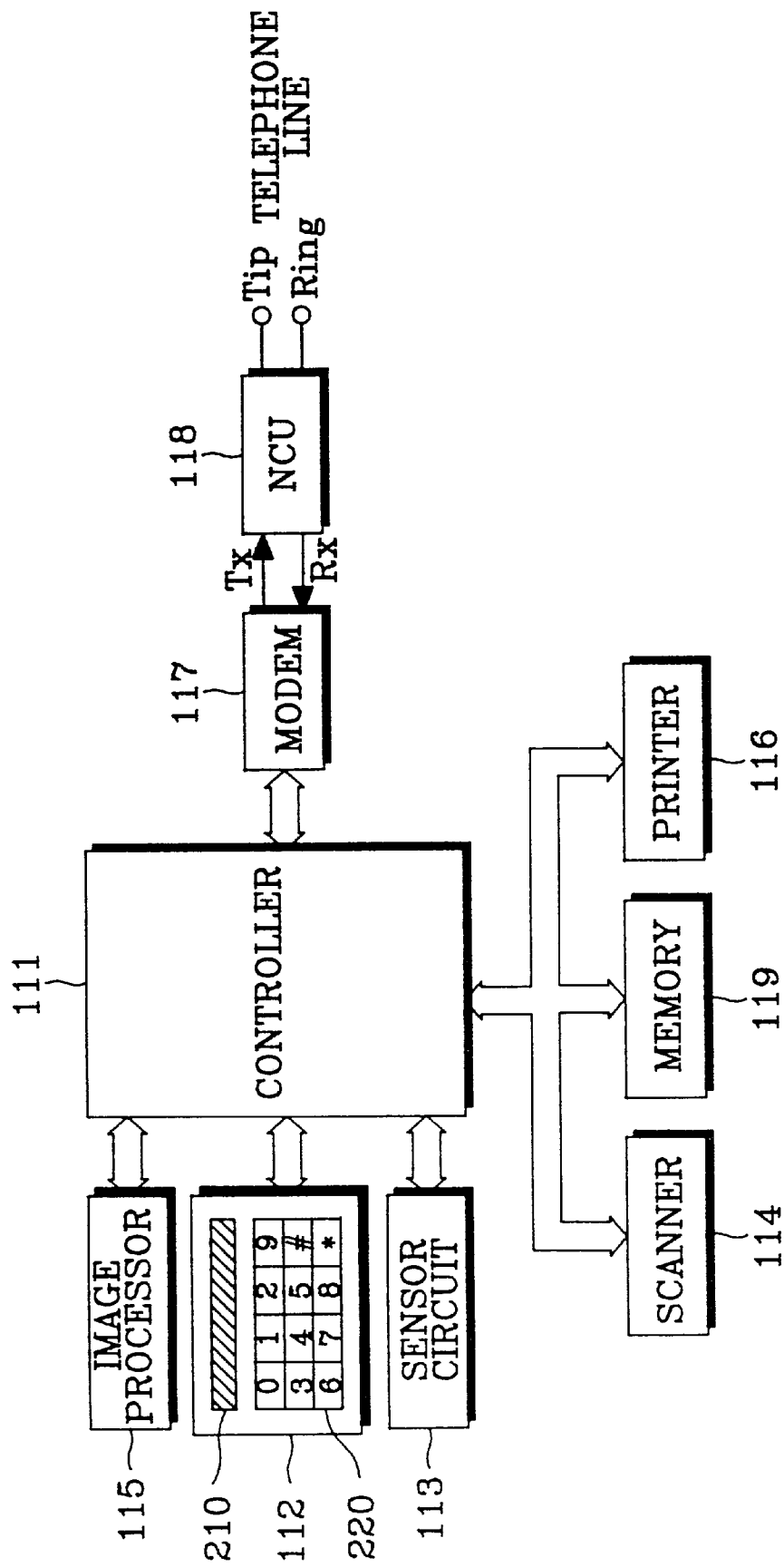
FIG. 1 is a system block diagram of a facsimile to which the present invention will be employed.

A preferred embodiment of the present invention will be described in detail hereinbelow with reference to the attached drawings, in which the like reference numerals represent the like elements. Further, it should be clearly understood by those skilled in the art that many specifics such as the detailed circuit elements are shown only by way of an example to bring a better understanding of the present invention and the present invention may be embodied without those specifics. Moreover, it should be noted that detailed descriptions of the related prior art may have been intentionally omitted if it was believed to be unnecessary in describing the concepts of the present invention.

Referring to FIG. 1, there is illustrated a system block diagram of a facsimile machine to which the present invention will be employed. In the drawing, a controller 111 controls an overall operation of the facsimile machine, such as a transmission mode, a reception mode, and a copy mode. Further, the controller 111 includes a program memory and a data memory which may be prepared therein or connected thereto externally as represented by the reference numeral 119. The program memory stores a software program according to the present invention and the data memory temporarily stores data which are generated during performing the program. An OPE (Operating Panel) 112 is comprised of a key input device 220 and a display 210. The key input device 220 generates key data for setting the resolution modes and/or performing the set resolution mode, and transmits the key data to the controller 111. The display 210 displays operational states of the system while the controller 111 performs the respective modes. A sensor circuit 113 senses the existence and/or nonexistence of the document and the printing paper, to generate sensing signals to the controller 111. A scanner 114 transmits, to the controller 111, an image that a CCD (Charge Coupled Device; not shown) has scanned. The image undergoes a photoelectric conversion prior to being applied to the controller 111. An image processor 115 codes and decodes image data from the scanner 114 and image data from a modem 117. Specifically, the image processor 115 divides the image data from the scanner 114 into background data and text data, and generates grey image data, so as to allow the called facsimile machine to restore the image data to the original state. A printer 116 prints, on a printing paper, the image data received from the image processor 115 according to the control of the controller 111 while performing the reception mode and copy mode. The modem 117 is controlled by the controller 111 and converts data from the controller 111 into analog signal and/or converts signals received from communication lines into digital data. Specifically, during the transmission mode of operation, the modem 117 modulates the image data from the image processor 115 to be consistent with a standard transmission format of the facsimile machine and transmits the modulated signal through the communication line. Alternatively, during the reception mode of operation, the modem 117 demodulates the coded image signal received from the communication line into its original state so that it can be processed by the controller 111. An NCU (Network Control Unit) 118 forms a transmission/reception path of telephone lines Tip and Ring, and the modem 117 according to the control of the controller 111.

Figure 2:
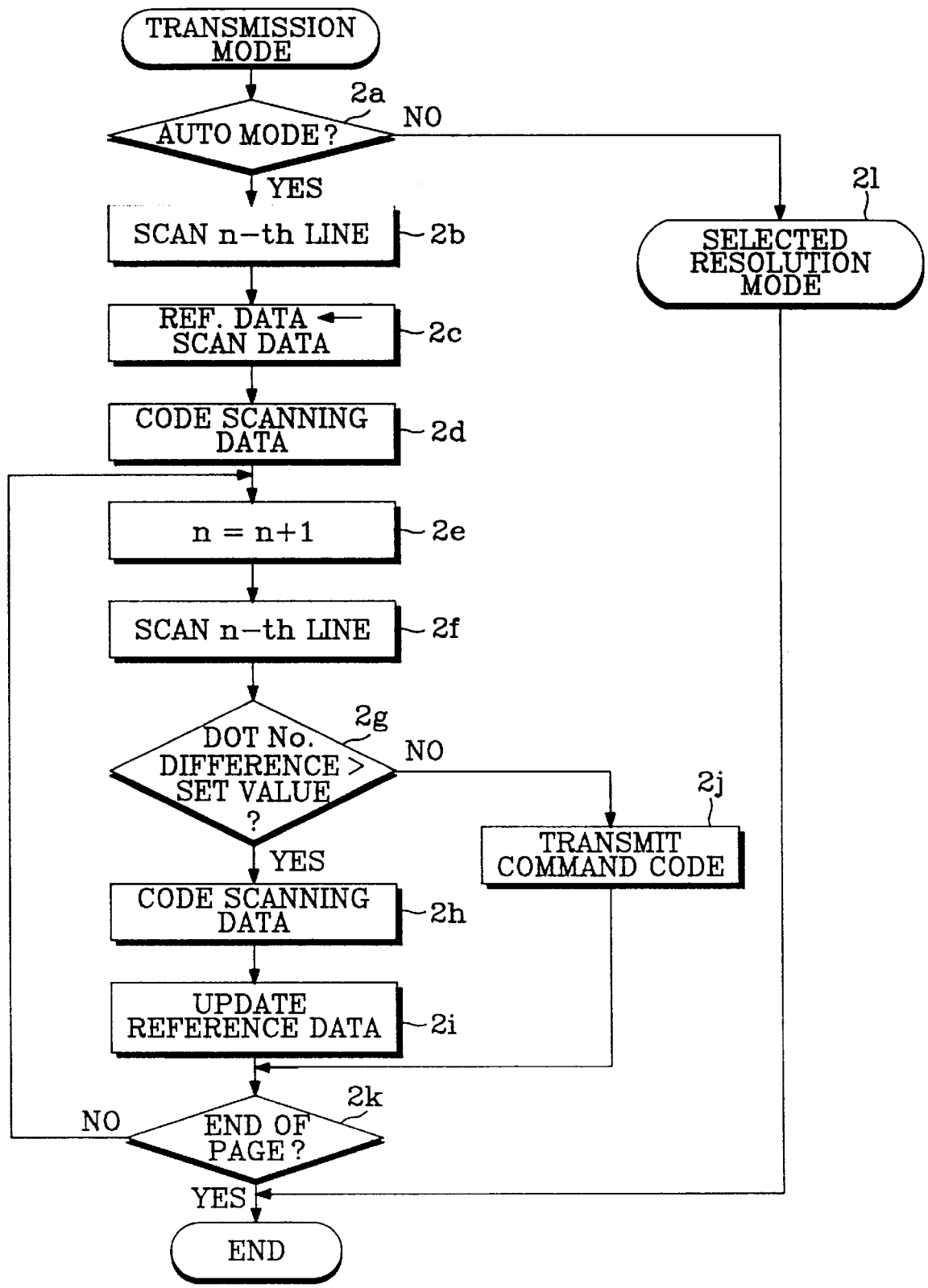
FIG. 2 is a flowchart for automatically controlling a resolution of a document according to an embodiment of the present invention.

Referring to FIG. 2, there is shown a process flowchart for automatically controlling the resolution according to a preferred embodiment of the present invention. It is checked, at a step 2a, whether or not to perform the automatic resolution control function according to the present invention. If the automatic resolution control function is set at the step 2a, the controller 111 proceeds to a step 2b to scan an n-th line of the document wherein "n" represents a variable designating a scanning line.

Scanning data of the n-th line is stored as reference data, at a step 2c. At the same time, the scanning data of the n-th line is coded by a predetermined coding method to be transmitted to a called facsimile machine, at a step 2d. Upon completion of the transmission, the variable "n" is increased by one, at a step 2e. The increased line is scanned, at a step 2f. Turning back to the step 2a, if it is assumed that the n-th line is a first line, the n+1-th line of the step 2e will become a second line.

The scanning data of the increased line is compared with the reference data, at a step 2g, to detect whether or not a dot number difference therebetween is greater than a predetermined value. If the dot number difference is greater than the predetermined value, the scanning data of the increased line is coded by the predetermined coding method and transmitted to the called facsimile machine, at a step 2h. The reference data is updated with the scanning data of the increased line, at a step 2i. However, if the dot number difference is less than or equal to the predetermined value, a command code for instructing the called facsimile machine to print the same image as that of the previous line is transmitted, at a step 2j.

Specifically, if the dot number difference is relatively small, the controller 111 transmits the command code for instructing the called facsimile machine to print the same image data as that of the preceding line, instead of scanning a corresponding line to transmit. In this way, it may be possible to save the time required for coding scanning data of the corresponding line and the time for transmitting the same. Therefore, the printing time at the called facsimile machine may be reduced remarkably.

Meanwhile, it is checked whether or not it is an end of a page, at a step 2k. If it is not the end of the page, the process flow goes back to the step 2e to increase the variable "n" by one and repeat the succeeding steps.

On the other hand, if the automatic resolution control function is not set at the step 2a, the process flow proceeds to a step 2l to execute a process routine of a selected resolution mode.

As described in detail heretofore, the facsimile machine according to the present invention controls the resolution of a document automatically. Therefore, it may not be necessary for the user to re-establish the resolution mode for every page of the document, thereby offering convenience to the user. Further, the facsimile machine can transmit the document with a mixture of elaborative image and a normal image, automatically controlling the resolutions.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method of controlling a resolution of an image scanned from one document page by an image processing system, said image being transmitted to a counterpart image processing system to be printed on a printing paper, comprising the steps of:

scanning an n-th line of the image, n being a positive integer, and storing scanning data of the n-th line as reference data and coding the scanning data by a predetermined coding method, and transmitting the coded scanning data;

scanning a next line of the image, and comparing scanning data of the next line with the reference data to detect a dot number difference therebetween and checking whether or not the dot number difference is greater than a predetermined value; and transmitting a command code for instructing the counterpart image processing system to print a same image as that of a preceding line, if the dot number difference is less than or equal to the predetermined value;

whereby a document with a mixture of an elaborative image and a normal image may be transmitted controllably according to an elaboration of the image.

2. A method of controlling a resolution of an image scanned from one document page by a first facsimile machine, said image being transmitted to a second facsimile machine to be printed on a printing paper, comprising the steps of:

(a) initializing a line designating variable, and scanning the image by one line and storing corresponding scanning data as reference data;

(b) coding the scanning data with a predetermined coding method and transmitting the coded scanning data to the second facsimile machine;

(c) increasing said line designating variable by one;

(d) scanning the increased line and comparing corresponding scanning data with the reference data, for detecting a dot number difference therebetween and checking whether or not the dot number difference is greater than a predetermined value;

(e) if the dot number difference is greater than the predetermined value, coding the scanning data of the increased line by the predetermined coding method and transmitting the coded scanning data to the second facsimile machine, and updating the reference data with the scanning data of the increased line;

(f) if the dot number difference is less than or equal to the predetermined value, transmitting to the second facsimile machine a command code for instructing it to print a same image as that of a preceding line; and (g) upon completion of step (e) or step (f), checking whether it is an end of a page, and if it is not the end of the page, returning to the step (c).

3. An apparatus for controlling a resolution of an image scanned from one document page by an image processing system, said image being transmitted to a counterpart image processing system to be printed on a printing paper, comprising:

a scanner for scanning an n-th line of the image, n being a positive integer, and a memory for storing scanning data of the n-th line as reference data and a coder for coding the scanning data by a predetermined coding method, and a transmitter for transmitting the coded scanning data;

said scanner scanning a next line of the image, and a comparator for comparing scanning data of the next line with the reference data stored in the memory to detect a dot number difference therebetween and for checking whether or not the dot number difference is greater than a predetermined value; and said transmitting means transmitting a command code for instructing the counterpart image processing system to print a same image as that of a preceding line, if the dot number difference is less than or equal to the predetermined value;

whereby a document with a mixture of an elaborative image and a normal image may be transmitted controllably according to an elaboration of the image.

4. An apparatus for controlling a resolution of an image scanned from one document page by a first facsimile machine, said image being transmitted to a second facsimile machine to be printed on a printing paper, comprising:

(a) a means for initializing a line designating variable, and a scanner for scanning the image by one line and a memory for storing corresponding scanning data as reference data;

(b) a coder for coding the scanning data with a predetermined coding method and a transmitter for transmitting the coded scanning data to the second facsimile machine;

(c) a increasing means for increasing said line designating variable by one;

(d) said scanner scanning the increased line and a comparator for comparing corresponding scanning data with the reference data, for detecting a dot number difference therebetween and for checking whether or not the dot number difference is greater than a predetermined value;

(e) if said comparator determines that the dot number difference is greater than the predetermined value, said coder coding the scanning data of the increased line by the predetermined coding method and said transmitter transmitting the coded scanning data to the second facsimile machine, and said memory updating the reference data with the scanning data of the increased line;

(f) if said comparator determines that the dot number difference is less than or equal to the predetermined value, said transmitter transmitting to the second facsimile machine a command code for instructing it to print a same image as that of a preceding line; and (g) upon completion of the comparison by the comparator in (e) or (f), means for checking whether it is an end of a page, and if it is not the end of the page, said increasing means increasing said line variable by one as in (c), subsequently followed by (d).

5. A method of controlling a resolution of an image scanned from one document page by an image processing system, said image being transmitted to a counterpart image processing system, comprising the steps of:

scanning an n-th line of the image, n being a positive integer, and storing scanning data of the n-th line as reference data and coding the scanning data by a predetermined coding method, and transmitting the coded scanning data;

scanning a next line of the image, and comparing scanning data of the next line with the reference data to detect a dot number difference therebetween and checking whether or not the dot number difference is greater than a predetermined value; and transmitting a command code for instructing the counterpart image processing system to store a same image as that of a preceding line as an image of the next line, if the dot number difference is less than or equal to the predetermined value;

whereby a document with a mixture of an elaborative image and a normal image may be transmitted controllably according to an elaboration of the image.

6. A method of controlling a resolution of an image scanned from one document page by a first facsimile machine, said image being transmitted to a second facsimile machine, comprising the steps of:

(a) initializing a line designating variable, and scanning the image by one line and storing corresponding scanning data as reference data;

(b) coding the scanning data with a predetermined coding method and transmitting the coded scanning data to the second facsimile machine;

(c) increasing said line designating variable by one;

(d) scanning the increased line and comparing corresponding scanning data with the reference data, for detecting a dot number difference therebetween and checking whether or not the dot number difference is greater than a predetermined value;

(e) if the dot number difference is greater than the predetermined value, coding the scanning data of the increased line by the predetermined coding method and transmitting the coded scanning data to the second facsimile machine, and updating the reference data with the scanning data of the increased line;

(f) if the dot number difference is less than or equal to the predetermined value, transmitting to the second facsimile machine a command code for instructing it to store a same image as that of a preceding line as an image of the next line; and (g) upon completion of step (e) or step (f), checking whether it is an end of a page, and if it is not the end of the page, returning to the step (c).

7. An apparatus for controlling a resolution of an image scanned from one document page by an image processing system, said image being transmitted to a counterpart image processing system, comprising:

a scanner for scanning an n-th line of the image, n being a positive integer, and a memory for storing scanning data of the n-th line as reference data and a coder for coding the scanning data by a predetermined coding method, and a transmitter for transmitting the coded scanning data;

said scanner scanning a next line of the image, and a comparator for comparing scanning data of the next line with the reference data stored in the memory to detect a dot number difference therebetween and for checking whether or not the dot number difference is greater than a predetermined value; and said transmitting means transmitting a command code for instructing the counterpart image processing system to store a same image as that of a preceding line as an image of the next line, if the dot number difference is less than or equal to the predetermined value;

whereby a document with a mixture of an elaborative image and a normal image may be transmitted controllably according to an elaboration of the image.

8. An apparatus for controlling a resolution of an image scanned from one document page by a first facsimile machine, said image being transmitted to a second facsimile machine, comprising:

(a) a means for initializing a line designating variable, and a scanner for scanning the image by one line and a memory for storing corresponding scanning data as reference data;

(b) a coder for coding the scanning data with a predetermined coding method and a transmitter for transmitting the coded scanning data to the second facsimile machine;

(c) a increasing means for increasing said line designating variable by one;

(d) said scanner scanning the increased line and a comparator for comparing corresponding scanning data with the reference data, for detecting a dot number difference therebetween and for checking whether or not the dot number difference is greater than a predetermined value;

(e) if said comparator determines that the dot number difference is greater than the predetermined value, said coder coding the scanning data of the increased line by the predetermined coding method and said transmitter transmitting the coded scanning data to the second facsimile machine, and said memory updating the reference data with the scanning data of the increased line;

(f) if said comparator determines that the dot number difference is less than or equal to the predetermined value, said transmitter transmitting to the second facsimile machine a command code for instructing it to store a same image as that of a preceding line as an image of the next line; and (g) upon completion of the comparison by the comparator in (e) or (f), means for checking whether it is an end of a page, and if it is not the end of the page, said increasing means increasing said line variable by one as in (c), subsequently followed by (d).

* * * * *